United States Patent [19]

Harding

[11] Patent Number: 5,201,109
[45] Date of Patent: Apr. 13, 1993

[54] METHOD AND APPARATUS FOR DETACHABLY JOINING TWO MEMBERS

[75] Inventor: Claude J. Harding, Phoenix, Ariz.

[73] Assignee: Shintech, Inc., Phoenix, Ariz.

[21] Appl. No.: 752,846

[22] Filed: Aug. 30, 1991

Related U.S. Application Data

[63] Continuation-in-part of Ser. No. 617,506, Nov. 23, 1990, abandoned.

[51] Int. Cl.$^5$ .................... B23P 11/02; B21D 39/00
[52] U.S. Cl. ................................. 29/451; 29/455.1; 29/525; 29/773; 29/240
[58] Field of Search ............... 29/240, 243.57, 243.58, 29/240.5, 244, 253, 445, 455.1, 525, 773, 451; 215/204, 206, 213, 216, 220–225, 263, 273, 274, 279, 280; 217/79; 220/319

[56] References Cited

U.S. PATENT DOCUMENTS 3,680,346 8/1972 Wilcox .................. 29/243.58 X
4,372,022 2/1983 Puchett .................. 29/243.58

Primary Examiner—Timothy V. Eley
Attorney, Agent, or Firm—Cahill, Sutton & Thomas

[57] ABSTRACT

A method and apparatus are disclosed for detachably joining two members at a plurality of points along their corresponding edges and without longitudinal displacement of these edges during and after closure of the joint. A movable wedge means is advanced between pairs of force receiving points connected to each of the two members. As the wedge means is advanced in the apex direction, the pairs of points are forced apart and, in direct response, the corresponding edges are drawn together. Variations on two fundamental embodiments are disclosed, one is linear and the other is circular. In the linear embodiments, two doors, panels or bars are joined. In the circular embodiments, round tubes or rods are joined or a circular cap is secured to a container or enclosure. The invention may also be embodied in kits for joining linear or circular members. In other embodiments, a gasket material and/or other component is retained between the corresponding edges.

53 Claims, 7 Drawing Sheets

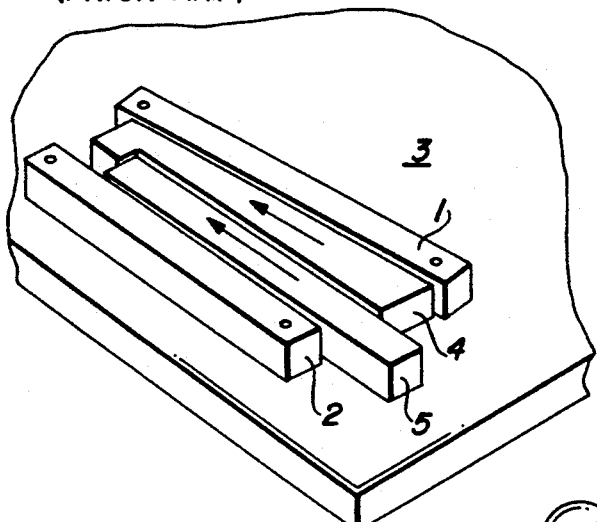
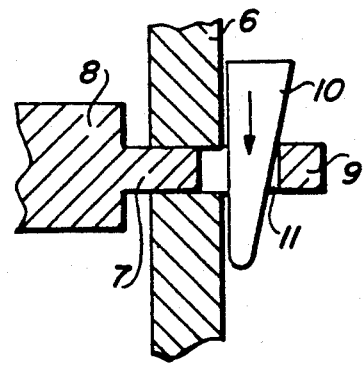
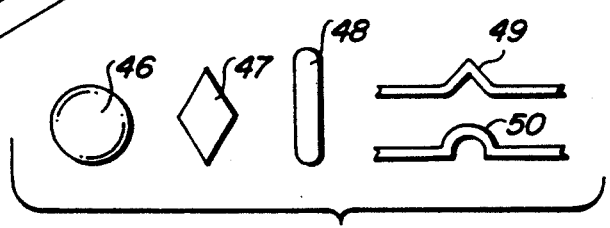
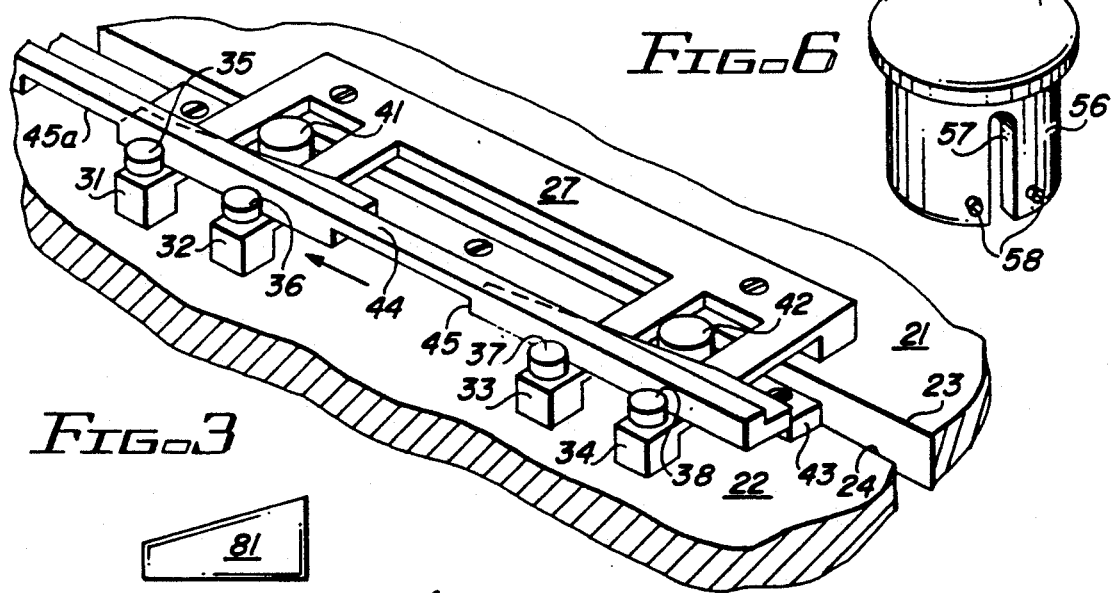

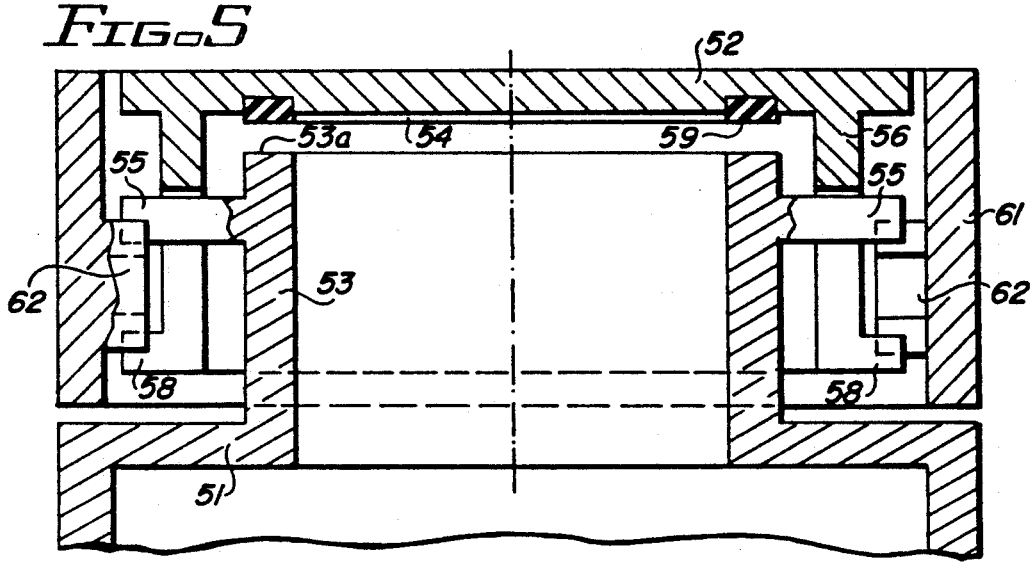
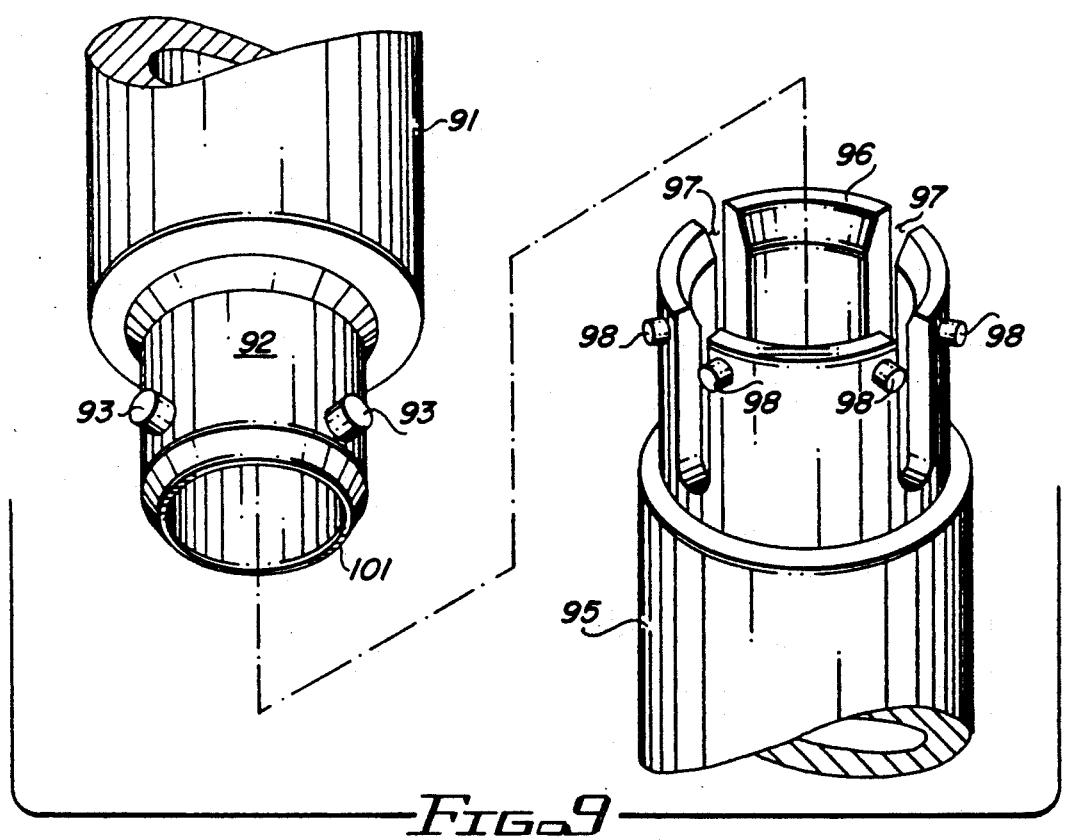
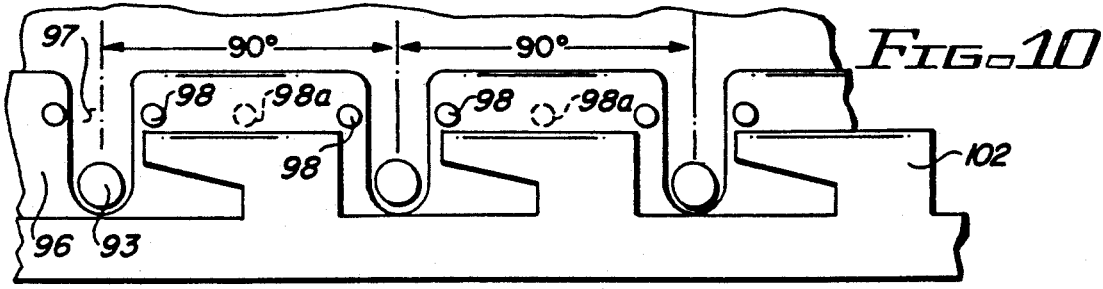

METHOD AND APPARATUS FOR DETACHABLY JOINING TWO MEMBERS

This is a continuation-in-part of application Ser. No. 07/617,506, filed Nov. 23, 1990, and abandoned after the filing of this application.

BACKGROUND OF THE INVENTION

The claimed invention is a method and apparatus for detachably joining two members and, in particular, for joining two members through the use of a movable wedge means.

The technical problems associated with joining two members to form a solid connection have been known for many centuries. These problems are compounded when it is also desired to have the capability of disassembling the two members non-destructively. Further technical problems are introduced when the objective is not merely to detachably join two members but also to provide wide distribution of forces along the joined edges, or to provide a fluid seal at the joined edges, or to join the edges without substantial longitudinal movement, or to transmit rotational torque across the joint.

A complete discussion of the various techniques developed over the years for addressing one or more of these objectives would encompass many volumes of technical information and thousands of prior patents. However, there are three basic techniques which are of particular interest in conjunction with the present invention. These may be referred to in terms of the mechanical structures which may be used to create joining forces between the two members: (1) the wedge, (2) the screw, or (3) the cam.

There are two ways a wedge can be used to detachably fasten two members. The first is by means of a jam fit, where the wedge is forced between fixed members to take up the slack in an otherwise loose fit. In these applications, the components forming the joint are placed in compression. One example of this form of detachable joint is the wedge clamp illustrated in FIG. 1 which is used on the work benches of carpenters.

In prior art FIG. 1, two rails 1 and 2 are fixed to a work bench 3 and wedge 4 is advanced in the direction of its apex to retain work piece 5 (first member) against rail 2 (second member). While this technique results in a firm connection between the corresponding edges of work piece 5 and rail 2, the connection is directional. Longitudinal forces along the edges in one direction will tighten the joint while forces in the opposite direction will cause detachment. This type of wedge joint is also characterized by longitudinal displacement along the edges of the two members as they are being joined. As will be discussed below, this is a significant disadvantage in many applications.

The second way a wedge can be used to detachably join two members involves placing a portion of one member in tension. This second technique has also been employed in carpentry, as illustrated in FIG. 2, where first member 6 includes through mortise 7 and second member 8 has extended tenon 9 with wedge 10 inserted into opening 11 through tenon 9. This method has been used in trestle tables and in post and beam construction. The two members are joined by driving wedge 10 into opening 11 thereby placing tenon 9 in tension and drawing second member 8 firmly into contact with first member 6. While this form of wedged tenon joint is quite strong in opposing forces exerted along the central axis of the two members, the joint is notoriously poor with respect to pivotal or shear forces exerted between the two members.

Similar prior art applications where a wedge has been used to join two members are described in U.S. Pat. No. 544,823 (a wedge used to attach a side rail to a bedpost); U.S. Pat. No. 1,542,888 (a wedge used to hold a framed screen in place over a window); and, U.S. Pat. No. 1,877,263 (a wedge used to secure the sliding door on a boxcar in position during transit).

The screw is often likened to a wedge because, fundamentally, both structures incorporate inclined planes to gain mechanical advantage. However, the screw is quite different from the wedge because a screw joint (between two members, such as a jar and a screw-on cap) requires rotational motion between the two members being joined. As the cap is tightened, the upper edge of the jar engages the inside of the cap to form a line or annular surface of contact. Friction between the first member (jar) and the second member (cap) makes closing or opening the jar difficult. The relative motion between the two members may also distort or damage gasket material placed between the cap and the jar, leading to a loss of sealing integrity after only a few uses. The amount of friction encountered in joining two threaded members is proportional to the length and pitch of the thread. In many cases this inherent friction makes connection and disconnection difficult.

The fact that screw joints require substantial rotational movement between the two members being joined often adds difficulty, especially where the two members are long, flexible or resilient, since the rotational motion required to make the connection may lead to misalignment, kinking or complex handling of the members. In addition, the frictional forces created between the moving surfaces being joined in a screw connection can be so great as to impede or prevent rotational movement in the opposite direction which is necessary to disengage the two members. This is often observed in the case of jars with threaded caps where the pitch of the thread is low to allow positive resealing but where this low pitch allows overtightening with resulting difficulty in later removal of the cap.

A cam is also frequently likened to a wedge. However, because a cam requires relative motion between the members being joined it shares many of the disadvantages associated with a screw. A common example of two members being joined through the use of a cam is the pressure cap detachably joined to the filler neck on an automotive radiator. In operation, the radiator cap is rotated relative to the filler neck. Portions of the cap engage cams on the filler neck and the pitch of the cams draws the cap down firmly over the top edge of the filler neck. The cap moves relative to the neck even after contact is made, abrading the components and often distorting the sealing gasket typically located between these two joined edges. To overcome the problems associated with friction contact and relative motion between the edges, intermediate rotational elements have been used, adding further complexity to the joining and sealing of the cap.

A screw type attachment mechanism, depending on the thread pitch, may require several complete rotations of one of the members to effect complete attachment. In the production or use of a variety of goods, this is needlessly time consuming. This inefficiency can be lessened through use of a cam connection where one member is rotated less than one complete revolution. While the process of assembly or disassembly is faster, because fewer turns are required, the friction and displacement between the two members being joined still present many disadvantages.

Caps for jars or containers which are intended to be sealed typically employ either a screw type mechanism or a low pitch cam. With the current need for "child-proof" caps, clutch mechanisms and variable pitch cams are also employed. In all cases, however, the problem remains of the cap and jar binding during the last stages of the attachment. This not only wears the seal but also increases the force required to close or to reopen the container, often to the point where weak, aged or infirm people are unable to remove the stuck cap.

In view of the foregoing, it is therefore an object of the present invention to provide a method and apparatus for detachably joining two members without having substantial displacement between the two members along their respective edges of contact.

Another object of the present invention is to provide means for detachably joining two members and thereafter transmitting substantial torque or shear across the joint without relative motion between the edges of contact.

Another object of the present invention is to provide a means for releasably sealing the joint between two members.

Another object of the present invention is to provide an improved cap or closure for jars, containers or enclosed volumes.

Another object of the present invention is to provide a method and apparatus for detachably joining two members of circular section wherein connection is accomplished through the movement of a wedge means through a turn of less than 180° while the two members themselves do not rotate relative to one another during or after attachment.

Another object of the present invention is to provide a method and apparatus for detachably joining two members by the exertion of predetermined forces between the two members being joined.

Another object of the present invention is to detachably join two members along their respective edges through the exertion of forces distributed among a plurality of points along the edges being joined.

Another object of the present invention is to axially join and detach two members of circular cross-section without substantial rotational movement between the two members.

Another object of the present invention is to provide a kit of components suitable for connection to two linear or circular members for the purpose of detachably joining the two members along their corresponding edges.

SUMMARY OF THE INVENTION

The foregoing objects are achieved in the present invention wherein a wedge means is displaced along a linear or circular path between pairs of force transfer means which draw the edges of the two members being joined closer together as the wedge means is advanced in the apex direction to separate the pairs of force transfer means. In its linear form, the present invention provides a plurality of wedges located between and engaging a corresponding plurality of paired force transfer means. One of the force transfer means in each pair is coupled to the first member and the other force transfer means is coupled to the second member. As the plurality of wedges are linearly advanced, they progressively separate the pairs of force means, which in turn draw the first and second members together at their corresponding edges to form a line or surface of contact without longitudinal or sliding motion between the two members. In its circular form, the present invention provides a plurality of wedges attached to a collar which rotates with respect to the force transfer means, progressively separating them and thereby drawing the first and second members together at their corresponding edges to define a circular line, annulus or area of contact without substantial rotational movement between the two members being joined.

A more complete understanding of the present invention can be obtained by considering the following detailed description in conjunction with the accompanying drawings in which:

FIG. 1 generally illustrates one form of prior art wedge connection where members are put in compression.

FIG. 2 generally illustrates a form of prior art wedge connection where members are put in tension.

FIG. 3 generally illustrates the functional element in a simplified linear embodiment of the present invention including two pairs of force transfer means and corresponding movable wedge means.

FIG. 4 illustrates a few of the many different forms of force transfer means suitable for use in various embodiments of the invention.

FIG. 5 illustrates a simplified circular embodiment of the present invention including two pairs of force transfer means and a corresponding wedge means in the form of a rotating collar.

FIG. 6 is a perspective view of the first member or cap incorporated in the embodiment shown in FIG. 5.

FIG. 7 illustrates one segment of the wedge means or rotating collar from the embodiment of FIG. 5.

FIG. 8 illustrates a few of the many different wedge configurations which can be incorporated into the wedge means of either linear or circular embodiments of the present invention.

FIG. 9 is an expanded perspective view of two pipes (or circular rods) with four pairs of symmetrically distributed force transfer means suitable for axially joining the two members in accord with the present invention.

FIG. 10 depicts the relative distribution of the force transfer means shown in FIG. 9 wherein the first and second members and the joint between them have been longitudinally sectioned and rolled out to a flat configuration for better illustration of the relationship between the linear and circular embodiments of the invention.

DETAILED DESCRIPTION

Figure 11:
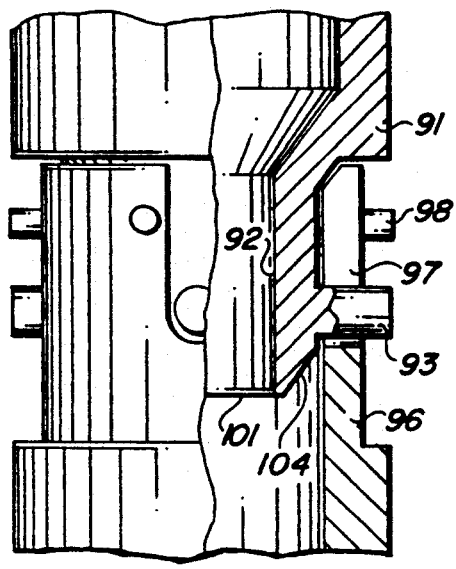
FIG. 11 is a partial cross-sectional view of the junction between the two members of FIG. 9.

FIG. 3 illustrates a simplified embodiment of the present invention wherein the motion of the wedge means is linear and operates to join two planar members together at their corresponding edges. Specifically, first member 21 and second member 22 have corresponding edges 23 and 24, which are to be joined together. Preferably, the surfaces of edges 23 and 24 correspond to each other in shape to assure a close fitting joint. While shown as being straight in FIG. 3, corresponding edges 23 and 24 may assume any geometrically mated shapes. For example, they could be mated serpentine, serrated, or any other form of fitted edges having large scale variations in their shape. Edges having such variations may be joined through use of the present invention which allows joining without longitudinal movement between the edges which move only toward or away from each other as the detachable joint is closed or opened.

Small scale variations, which would merely be termed rough edges, can be compensated for through the introduction of a resilient or deformable intermediate member, such as a gasket, between corresponding edges 23 and 24. An intermediate gasket can also compensate for minor misalignment between edges 23 and 24. In applications where the joint between members 21 and 22 must be impermeable to fluid passage, it is important to more closely match corresponding edges 23 and 24 and/or incorporate an appropriate gasket.

Attached to first member 21 is a bracket 27. Bracket 27 comprises two spaced sets of force transfer means: One includes extensions 31 and 32 together with the corresponding terminal posts 35 and 36. The other includes extensions 33 and 34 together with the corresponding terminal posts 37 and 38. These two sets of combined elements (27, 31, 32, 35, 36 and 27, 33, 34, 37, 38) are each separately referred to as first transfer means because they function to transfer forces to edge 23 of first member 21.

Attached to second member 22 is a second bracket 43 which includes two posts 41 and 42. These are separately referred to as second transfer means because they function to transfer forces to edge 24 of second member 22.

In the simplified embodiment of the invention shown in FIG. 3 there are two pairs of first and second force transfer means. Obviously there could be any number of pairs of transfer means distributed along edges 23 and 24. A minimum of two pairs is required to achieve the advantages of the present invention by providing a distribution of forces along corresponding edges 23 and 24.

The distance between extensions 31 and 32 is slightly greater than the diameter of post 41 just as the distance between extensions 33 and 34 is slightly greater than the diameter of post 42. Brackets 27 and 43 provide a fixed spatial relationship between the pairs of first and second transfer means and thus serve as registration means for movably aligning the first and second members in predetermined juxtaposition as their corresponding edges 23 and 24 are formed. Because posts 41 and 42 are constrained between extensions 31, 32 and 33, 34, respectively, longitudinal movement between edges 23 and 2 is substantially limited.

The two pairs of force transfer means which include elements 31, 32, 35, 36, 41 and 33, 34, 37, 38, 42 are positioned so that a wedge means 44 can be movably displaced between them. The wedge means 44 includes two spaced wedges for engaging the two corresponding pairs of force transfer means. The pitch of the wedges (i.e. the angle included at the apex) is a matter of design. Lower pitch provides greater mechanical advantage but results in less lateral displacement between the first and second members 21 and 22. The width of the wedges need only equal or exceed the maximum distance between pairs of posts 35, 36, 41 and 37, 38, 42 when edges 23 and 24 are in their final joined position.

In operation, members 21 and 22 are brought into registered juxtaposition with posts 41, 42 passing between extensions 31, 32 and 33, 34, respectively. Initially wedge means 44 is positioned to the right of the intermediate position shown in FIG. 3, allowing posts 37 and 38 pass through clearance 45 and posts 35 and 36 pass through clearance 45(a). As the two wedges of wedge means 44 are moved to the left, in the direction of their respective apexes, they pass between the two corresponding pairs of first and second transfer means (31, 32, 35, 36, 41 and 33, 34, 37, 38, 42). As the two individual wedges engage corresponding posts 35, 36, 41 and 37, 38, 42, the posts are forced apart and edges 23 and 24 are drawn together.

Because of the mechanical advantage provided by the pitch on wedge means 44, the force drawing edges 23 and 24 together is proportionally greater than the force required to advance wedge means 44 between the posts. It is important to note that, as members 21 and 22 move toward each other, there is no longitudinal sliding motion along corresponding edges 23 and 24, i.e., in the direction of their major common dimensions. Such displacement is substantially limited by the cooperation of posts 41, 42 and corresponding extensions 31, 32, and 33, 34. Accordingly, any gasket material placed between the edges being joined will be compressed without shear. In this embodiment these same structural elements serve to both register the corresponding edges 23, 24 and to limit longitudinal displacement between these edges during and after closure. In the simplified embodiment of FIG. 3, the structures 31-43 cooperate to perform the interrelated functions of registering edges 23, 24, limiting longitudinal displacement between edges 23,24 and transferring forces to edges 23, 24. In more complex embodiments, some or all of these functions may be performed in whole or part by separate structures. Since there is virtually no longitudinal displacement and thus no sliding friction between edges 23 and 24, additional tightening of the joint does not require the additional force which would otherwise be required to overcome such sliding friction. The friction between wedge means 44 and the posts 35-38 and 41, 42 is limited by the extremely small area of contact between these components. While the posts 35-38 and 41, 42 are illustrated in FIG. 3 as being circular cross-section, other cross-sectional shapes may be preferred depending upon the particular application, cost of manufacture, wedge pitch, and other design considerations.

FIG. 4 illustrates a few of the many alternative configurations possible for those portions of the transfer means which come in sliding contact with the wedge means. In general, it is desirable to minimize the area of contact to reduce (or control) friction between the wedge means and the transfer means. It is understood that design factors such as shape, material, surface finish, loading, displacement, etc. are details readily determined by persons of ordinary skill depending upon the the particular application.

In FIG. 4, post or pin 46 has a circular cross-section. Pin 47 has a diamond cross-section. Pins 46 and 47 can be solid or hollow and need not have straight longitudinal sides but can have shaped sides for modified contact with or retention of the wedge means. Pin 48 has an elongated cross-section with rounded ends for contact with an individual wedge. This configuration is particularly adapted for use in applications where substantial shear or torque will be transferred across the detachable joint formed by use of the present invention. Instead of a pin or post, the transfer means can be formed from sheet or bar material for contact with the wedge means. For example, item 49 in FIG. 4 has a corner or V-shaped section formed therein for contact with the wedge means while item 50 has a curved contact portion formed therein.

The simplified linear embodiment of the invention illustrated in FIG. 3 does not show the detailed structure used to hold wedge means 44 in its sliding position nor does it show a knob, handle or other structure for the user to grasp while sliding the wedge means between the two pairs of transfer means. One of the many alternative designs is shown in greater detail in conjunction with the embodiment of FIG. 18.

As will be further obvious to persons of ordinary skill, the functional components combined with the bracket 27, bracket 43 and wedge means 44 shown in FIG. 3 can be sold separately as a kit for installation on and use in joining first and second members 21, 22. Alternatively, these functional components can be formed as integral parts of the first and second members 21, 23.

FIG. 5 illustrates a circular embodiment of the present invention; specifically, as used to provide a high integrity cap seal for a container. Component dimensions and spacing have been exaggerated to provide a better understanding of the interrelationship of the functional elements. Here the first member is container 51 and it is to be joined to a second member which is the lid or cap 52. Container 51 encloses a volume (not fully illustrated) and terminates in an open neck 53 for receiving cap 52. The neck 53 is shown as having a reduced cross section, however, container 51 could be of uniform circular cross section for its entire length with cap 52 being proportionally larger and fitting over the end of container 51. As will be seen in conjunction with the embodiment illustrated in FIG. 12, one inherent advantage of the present invention is its ready adaptability to a broad range of designs and technical requirements.

Extending outwardly from neck 53 are first transfer means 55, illustrated as two pins located on diametrically opposite sides of neck 53. Cap 52 includes an inside edge 54 for engaging upper edge 53a of container 51. An optional gasket 59 may be retained within a corresponding annular groove in edge 54 of cap 52.

As illustrated in FIG. 6, the cap 52 from the FIG. 5 embodiment includes cylindrical skirt 56 having slots 57 formed therein to provide movable registration with the two transfer means 55 on neck 53. At the lower edge of skirt 56 (best seen in FIG. 6) are second transfer means 58, in the form of two pins located one on each side of registration slot 57.

Surrounding the upper portion of container 51 and skirt 56 of top 52 is a collar shaped wedge means 61. A section of wedge means 61 is illustrated in FIG. 7. Wedge means 61 comprises a cylindrical collar having two wedges 62 formed or attached along the inner surface and spaced on diametrically opposite sides to spatially correspond to the two pairs of pins 55, 58. When wedge means 61 is placed over cap 52 and cap 52 is placed over neck 53 of container 51, the wedges 62 can be advanced between each pair of first and second transfer means 55 and 58.

When the cap 52 and the surrounding collar 61 are placed over neck 53, the collar 61 is rotated so that the wedges do not interfere with the passage of pins 55 along slots 57. After the cap 52 is placed over neck 53 and the two members are in registered engagement, collar 61 is rotated to advance wedges 62 between pins 55 and 58, forcing them apart and drawing the cap 52 firmly down against the upper edge 53a of container 51.

The number of wedges and pairs of transfer means is dependent upon design considerations but there are at least two as illustrated for simplicity in the embodiment of FIG. 5. In the case of large diameter articles, the number of pairs of transfer means 55, 58 and the corresponding number of wedges 62 will be increased to better distribute the closing force along the joint between the first and second members. Similarly, where the seal formed at the corresponding edges of the first and second member is critical, the number of pairs will be increased and will be preferably located at uniform intervals along the edges being joined. These basic design considerations apply equally to linear embodiments of the invention, such as the one illustrated in FIG. 3, and to circular embodiments of the invention, such as the one illustrated in FIG. 5. The number of pairs of transfer means may also be increased in applications where high torque is transmitted across the joint between the first and second means.

The operation of the embodiment of FIG. 5 is functionally similar to that of FIG. 3. As wedge means 61 is rotated clockwise, transfer means 55 and 58 are forced apart, drawing cap 52 down onto the open end of container 51. Depending upon fabrication tolerances and the intended use for container 51, a gasket 59 of suitable resilient material may be added to achieve an appropriate seal at the joint between edges 53(a) and 54.

The closure motion imported to cap 52 is axial, not radial. Slot 57 in cooperation with pins 55 substantially limit the rotation of cap 52 with respect to container 51, both during and after closure. Thus, there is no abrasion of gasket 59 nor is there distortion of gasket 59 due to shear forces. Sliding friction between the cap 52 and the upper edge 53a of the container 51 is eliminated because displacement between edge 53a and gasket 59 is substantially limited in the direction of their major common dimension (i.e. the circumferential direction).

FIG. 8 illustrates a few of the many wedge configurations which may be incorporated as part of the wedge means used in either linear or circular embodiments of the invention. For any given wedge means, all of the individual wedges will preferably (although not necessarily) have the same shape. Simple wedge 81, which has a linear taper, is the type shown in FIGS. 3, 5 and 7. The width of the wedge varies uniformly as a function of the distance from the wedge apex. This simple wedge provides a uniform force for closing the joint as the wedge means is moved in the apex direction. Decreased pitch or wedge angle results in greater mechanical advantage.

Wedge 82 has a dual taper, one on each opposing side. This configuration increases the effective taper of the wedge and can be used to achieve more rapid closure of the joint.

Wedge 83 is similar to wedge 81 but it further includes a stop 84 to engage a transfer means (e.g. post 41 in FIG. 3 or post 55 in FIG. 5) and thereby prevent overtightening of the joint. This and other forms of wedges may also include a detent 85 to provide a physical indication of closure to the user and prevent loosening of the joint due to vibration or inadvertent contact with the wedge means.

Wedge 86 suggests a non-linear or variable taper, which could be either concave or convex, to accommodate many different joint closure and force programs.

Wedge 87 has two linear tapers in back-to-back relationship with their apexes in opposite directions. In addition, the tapered portions are spaced apart slightly by flat section 88 having a detent 89. This form of wedge enables one to open or close a joint by moving the wedge means in either direction. In addition, the flat provides a means for holding the joint in a closed position under a predetermined closure force. Detent 89 provides a means for holding the wedge in position and allows the user to feel when the joint is properly closed. Detent 89 can be of varied configuration and depth to afford greater protection against accidental release of the wedge means.

While the wedges of FIG. 8 show several techniques for varying the force and displacement characteristics of the wedge means, it is understood that these techniques are not mutually exclusive but can be combined. For example, a given wedge can have both a linear and a non-linear section or have an intermediate flat section to facilitate a seal being broken while retaining the cap in position over a pressurized container, thereby safely releasing pressure within a container before the cap is fully disengaged. A wedge having a series of flats, detents or serrations can be used to provide increased vibration resistance.

The present invention has wide utility in addition to the linear butt joint illustrated in FIG. 3 and the circular cap/container joint, illustrated in FIG. 5. For example, FIGS. 9 and 10 show an embodiment of the invention used for quickly and positively joining (and disconnecting) two pipes, tubes, hoses, cylinders or rods. The basic principles involved in detachably joining these cylindrical members are the same as already described in conjunction with the cap and container of FIG. 5. While the first and second members 91 and 95 in FIG. 9 are illustrated as tubular elements, the same configuration of functional elements will serve to form a joint between solid cylindrical members.

In one application, well drilling, sections of pipe (or rod) are typically joined by threading the end of one pipe into the end of the next pipe or threading adjacent sections of pipe (or rod) into an intermediate threaded collar. This process involves the handling of long and cumbersome members and requires the turning of one of the members while the other is restrained. These clamping and turning operations are time consuming, dangerous to workers and require complex equipment. Further, all of the steps necessary to connect adjacent sections must be repeated when the drilling members are removed from the hole. Occasionally, misalignment of members results in cross threading which requires removal of the damaged member and replacement by a new member. This further delays the drilling process. In addition, a threaded joint is not the ideal joint for conveying torque in these applications because the joint is constantly being tightened during the drilling operation, making disassembly of the drill pipe or rod an even slower and more difficult process. Thus, it would be desirable to have a strong, sealed joint which can be quickly made and disengaged without rotation of adjacent members and which is capable of transmitting high torque from one drill member to another. FIGS. 9-11 illustrate an embodiment of the present invention providing such a joint.

In FIGS. 9 and 11, the first member 91 terminates in reduced diameter end portion 92 having first transfer means 93 attached near the end thereof. Second member 95 terminates in cylindrical section 96 having registration slots 97. When the first and second members are axially engaged, transfer means 93 slide in slots 97 and transfer torque across the joint between first member 91 and second member 95. Second transfer means 98 are located at the end of section 96 on each side of slots 97. Additional means 98a may be located between the slots 99 as indicated by the dashed lines in FIG. 10. These are used for improved engagement with the wedge means 102.

FIG. 10 depicts the uniform distribution of slots 97 and transfer means 93, 98 at equal 90° intervals and shows wedge means 102 which has been omitted from FIG. 9 for clarity. FIG. 10 shows a flattened or rolled out view of the joint illustrated in FIGS. 9 and 11 and also illustrates the relationship between circular and linear versions of the invention.

In the FIG. 9 embodiment of the invention, there are four pairs of first and second transfer means symmetrically located around the ends of first and second members 91 and 95. The transfer means as shown take the form of circular pins 93, 98 capable of transmitting torque. These transfer means may also take the form of items 48 in FIG. 4 where very high torque is to be transmitted between the first and second members.

Wedge means 102 (FIG. 10) comprises a collar having wedges on the inside thereof positioned to interpose between transfer means 93 and 98, in the manner described in connection with the FIG. 5 embodiment of the invention.

Rotation of the wedge means 102 forces transfer means 93 and 98 apart and draws the end edges of first and second members 91 and 95 together. Slots 97 and transfer means 93 serve the interrelated functions of registering the first and second members for assembly, substantially limiting relative rotation of the two members, and transmitting torque from one member to the other across the joint. The fit of end portion 92 within the inside diameter of end section 96 also functions to provide registration between the two members 91, 95 in predetermined juxtaposition. The completed joint can be locked by means of radial pins (threaded or spring loaded) or through the use of appropriate detents in the wedges incorporated into wedge means 102.

Where the first and second members 91 and 95 are pipes, these can be sealed to allow the structure to carry fluids. As shown in FIGS. 9 and 11, the lower end 101 of first member 91 can be bonded and seated against a corresponding beveled shoulder 104 formed in second member 95. In addition, an appropriate sealant or gasket may be applied to or incorporated between the corresponding edges 101 and 104 to further assure a fluid-tight seal.

The joint can be very firmly tightened by rotating the collar or wedge means with a pipe wrench, chain wrench or spanner wrench. In this embodiment the first and second members 91 and 95 are registered by the concentric fit of end portion 92 into cylindrical section 96. Rotational displacement is substantially limited by pins 93 in slots 97.

The basic method and apparatus described in conjunction with FIGS. 9-11 can also provide a quick connect mechanism for joining hoses. In this application, the structure can be of molded plastic and include three pairs of symmetrically spaced transfer means 93, 98. Short rigid tubular sections 91 and 95 are connected by well-known mechanism to flexible hose, hose bibs, nozzles or tools depending upon the particular application. In addition, an annular rubber gasket will be typically placed between the joined edges for positive sealing of the joint. Such connectors can be sold as kits for attachment to hoses or hose bibs.

When the fluid carried by the connected hose is under high pressure, the wedge means functions during disconnection to allow the seal to be released before the first and second members can be fully separated, enabling stored pressure to be released and preventing one member from shooting off from the other and causing injury. This is particularly important, for example, in the case where air driven power tools are connected to high pressure sources. This is also important when the claimed method and apparatus are embodied in automotive radiators and caps therefor. Where the invention is used to connect hoses, the need for rotating joints between the coupling and hose is eliminated since threads are not employed and the two hoses being joined are not rotated relative to each other during connection.

Figure 13:
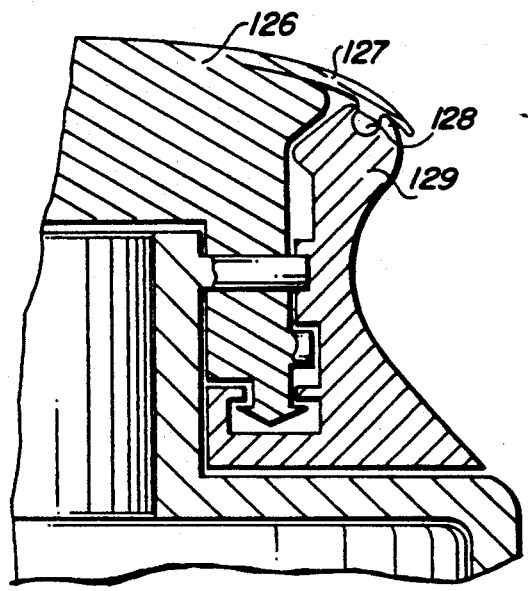
FIG. 13 illustrates a tamper proof variation of the cap and container of FIG. 12.
Figure 12:
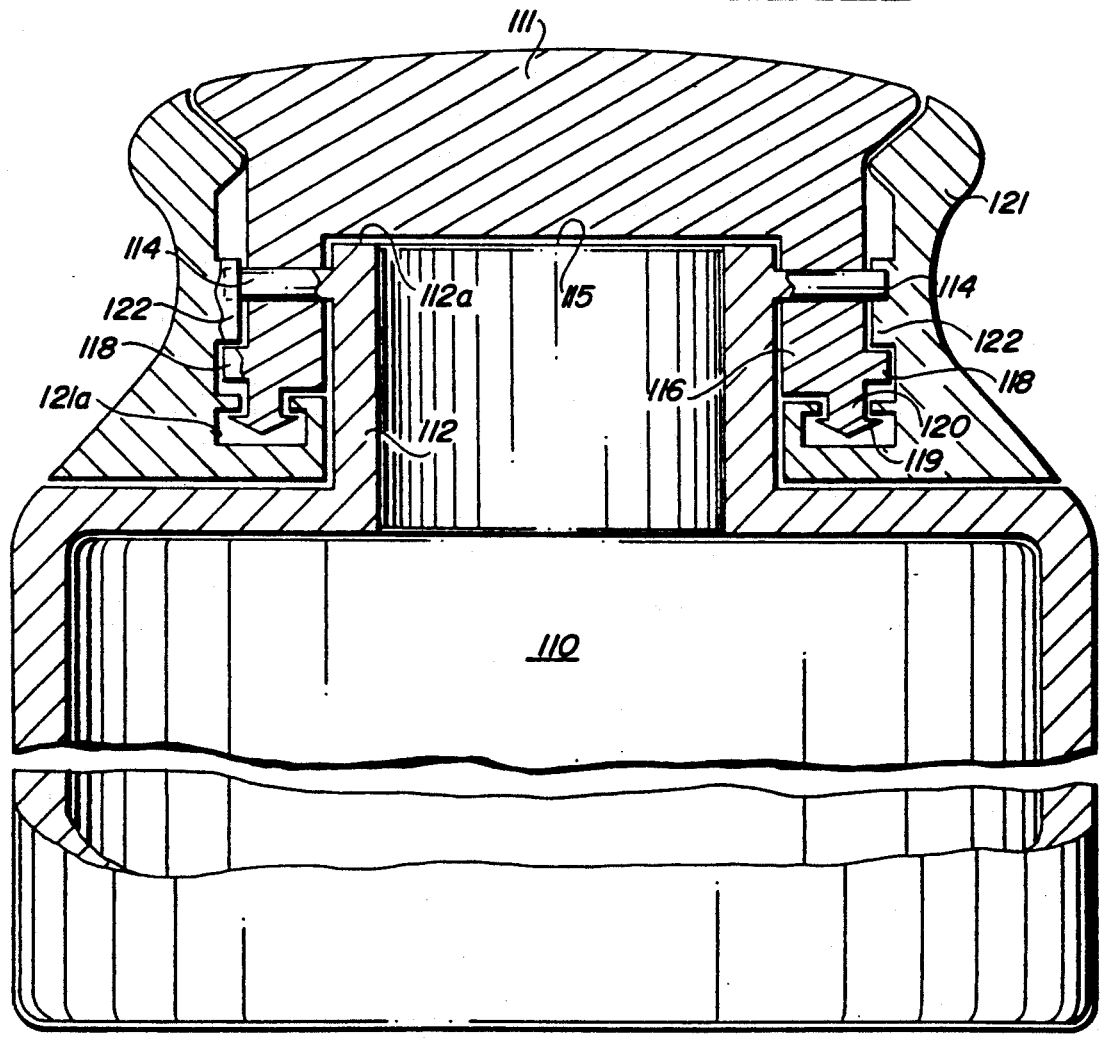
FIG. 12 illustrates the integration of ornamental design features into an embodiment of the invention used to detachably join a cap to a container for medicinal, cosmetic or other consumer products.

FIGS. 12 and 13 illustrate hose the present invention can be integrated with ornamental design features to provide an attractive container which is highly functional and easy to use. This embodiment is functionally similar to that of FIG. 5. Here container 110 is the first member, to be joined to cap 111, which is the second member. Container 110 encloses a volume and terminates in neck 112 for receiving cap 111. Extending outwardly from neck 112 are first transfer means 114 which are illustrated as pins or rods. Cap 111 includes an inside edge 115 for engaging the top edge 112a of neck 112. A collar-like wedge means 121 carries wedges 122 which are integrally formed on the inner surface of wedge means 121. The external portion of wedge means 121 provides a graceful transition between the top surface of cap 111 and the outer surface of container 110. Container 110, cap 111 and collar 121, may be made of a suitable plastic so that an additional gasket may not be necessary to obtain an acceptable seal.

Cap 111 includes cylindrical skirt 116. Toward the lower edge of skirt 116 are second transfer means 118, in the form of two pins located on opposite sides of registration slots (not shown) similar to slots 57 and FIG. 6. At the end of skirt 116 is retainer 119 formed at the end of extension 120. Retainer 119 snaps into the slotted annular recess 121a. Recess 121a extends in an arc at least partially around the perimeter of wedge means 121 so as to permit rotation of the wedge means relative to cap 111 while keeping the two parts together when they are removed from container 110.

Operation of the embodiment of FIG. 12 is functionally similar to that of FIG. 5. As wedge means 121 is rotated, transfer means 114 and 118 are forced apart by wedges 122, drawing cap 111 down onto the open end of neck 112. As with the embodiment of FIG. 5, the motion of cap 111 is vertical only and there is no rotation between cap 111 and container 110. Thus, there is no abrasion of cap 111 or neck 112 nor friction due to the sliding of cap 111 on container 110.

FIG. 13 illustrates one of many child-proof variations of the embodiment of FIG. 12 in which cap 126 is provided with two or more arms 127 having locking tabs 128 which fit into corresponding recesses formed in the upper edge of wedge means 129. Arms 127 extend beyond tabs 128 to provide tangs which can be grasped and lifted by an adult. Since raising both arms simultaneously while rotating wedge means 129 is beyond the ability of most young children, the container cannot ordinarily be opened by them. Since child-proof caps are a nuisance to the weak, aged, or infirm, arms 127 may be breakable or deformable at extreme flexure so that the child-proof mechanism can be defeated.

FIGS. 14-17 illustrate a linear form of the invention used to clamp or detachably fasten a plate window (or other panel) into a rigid frame. The invention is well suited to this sort of application which requires a secure, sealed connection that which can be made rapidly. Further, the clamping force can be distributed around the periphery of the window frame to avoid undue stress or torque the glass, especially when the frame is subject to thermal expansion and contraction.

Figure 14:
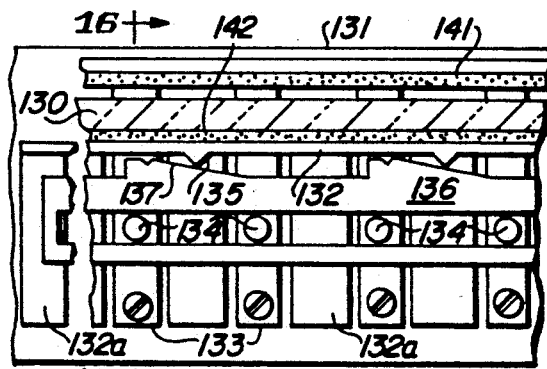
FIG. 14 illustrates an embodiment of the invention suitable for securing and sealing a plate glass window to a surrounding structural frame.
Figure 15:
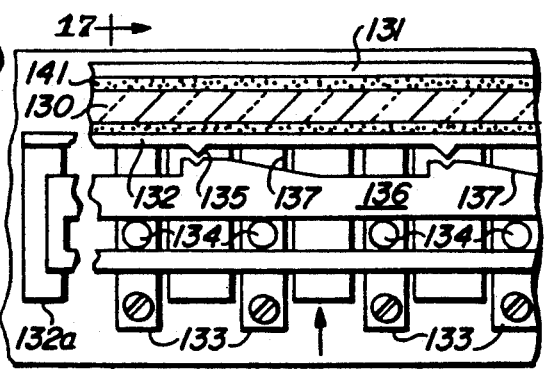
FIG. 15 illustrates the embodiment of FIG. 14 in a fully closed position.
Figure 16:
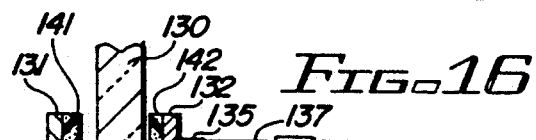
FIG. 16 is a cross-sectional view of the FIG. 14 embodiment taken along section 16—16.
Figure 17:
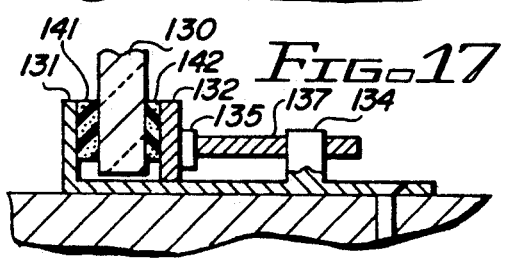
FIG. 17 is a cross-sectional view of the closed window clamp of FIG. 15 taken along section 17-17.

FIGS. 14 and 16 are top and side views, respectively, of a clamp in an intermediate position. FIGS. 15 and 17 are top and side views, respectively, of a clamp in a closed position. In these figures, glass pane 130 is positioned between first member 131 and second member 132. First member 131 is fixed to the frame of the window opening while second member 132 is movable. First member 131 includes a plurality of first transfer means consisting of extensions 133 and posts 134. Second member 132 includes a plurality of second transfer means in the form of protrusions 135. Second member 132 also includes a plurality of extensions 132a which are slidably engaged between extensions 133 and serve to register the first and second members 131 and 132 while substantially limiting longitudinal movement therebetween. Wedge means 136 has a plurality of wedges 137 for engaging corresponding pairs of first and second transfer means, 134 and 135. The wedges also include a deep detent for receiving and securing second transfer means 132 at a predetermined point to assure the optimal exertion of force against glass 130 while preventing unintentional displacement of wedge means 136 after installation. Gasket means 141 and 142 are placed on either side of the pane for sealing pane and providing a resilient interface between the glass and the first and second members.

In this use of the invention, the clamp can be formed continuously along each side of the pane or it can be a series of discrete clamps, the former being preferred. In addition, posts 134 may have an undercut configuration such as pins 181 illustrated in FIG. 19. Such an arrangement provides for better retention of wedge means 136, especially during overhead installation.

During installation, first member 133 is secured along the perimeter of the window frame. Glass 130 is then set in place. Second member 132 is inserted with extensions 132a slidably engaged between fixed extension 133. Wedge means 136 is then put in place and driven to the right until protrusions 135 are retained in the corresponding detents in wedge means 136. As with other embodiments of the invention, the closure motion is perpendicular to the plane of the joint so there is no abrasion of the window or distortion of the gaskets. Further, the entire installation can be carried out from inside the building, increasing safety and eliminating the need for outside scaffolds. Also, since the motion of the wedge is parallel to the plane of the window, one is less likely to inadvertently hit the window with a tool while driving the wedge means into position. This embodiment may also be configured to be sold as a kit of parts for installation in a window frame. Obviously, member 131 and/or pins 134 could be formed as integral parts of the window frame.

Figure 18:
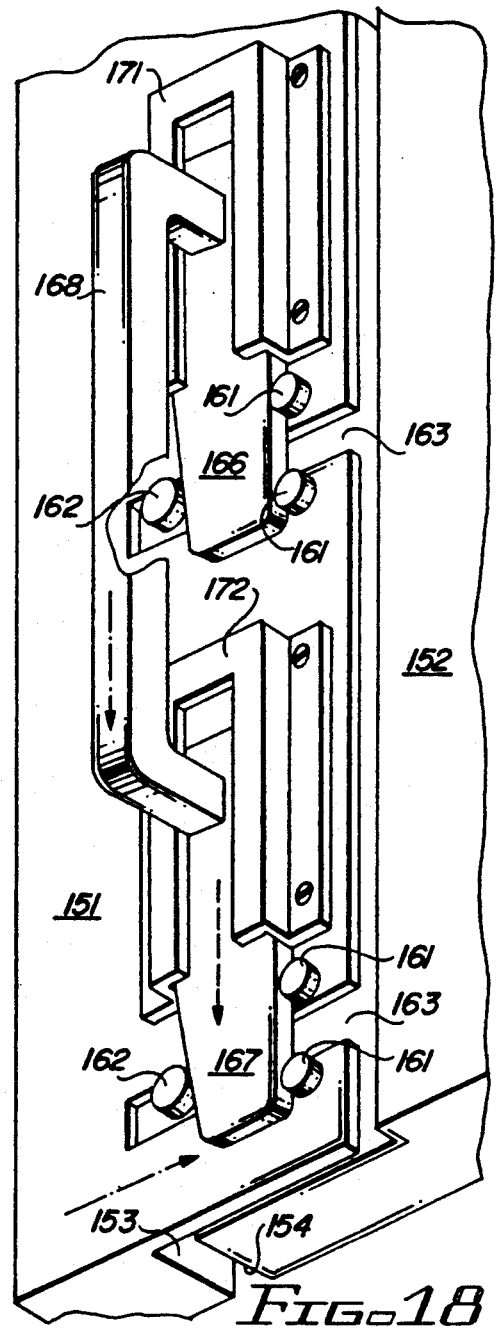
FIG. 18 illustrates a pivotal or sliding door closure embodying the present invention wherein the wedge means includes a handle.

FIG. 18 illustrates an embodiment in accordance with another aspect of the invention. Here the two members being joined either slide or pivot with respect to one another. For example, first member 151 may be a sliding door while second member 152 may be either a fixed door jamb or another sliding door. In this corresponding edges 153 and 154 are to be joined. Force transfer means 161 are attached to first member 151 on either side of registration slots 163. Force transfer means 162 are attached to second member 152. As first member 151 slides toward second member 152 transfer means 162 enter slots 163 and register the members relative to each other prior to joining the corresponding edges 153, 154. Thus, member 151 is capable of sliding left and right relative to member 152 while the two members remain generally coplanar. Typically member 151 will travel in a defined track.

A wedge means comprising wedges 166 and 167 and handle 168 may be advanced between transfer means 161 and 162. While only two pairs of transfer means are shown, the actual number used can be increased as required. Wedges 166 and 167 are retained and move within U-shaped brackets 171 and 172 which are secured to first member 151. By pulling the handle 168 in the direction of wedge apexes, transfer means 161 and 162 are forced apart and corresponding edges 153, 154 are drawn firmly together. Obviously a gasket or other form of weather stripping may be interposed between edges 153, 154 to provide a better seal.

The embodiment of FIG. 18 is particularly useful where one or both of the members 151 and 152 slide in a track (not shown) as in the case of sliding glass doors, pocket doors and sliding cabinet doors. However, in some applications it is desirable to securely join members 151 and 152 at their corresponding edges 153, 154 in an orthogonal direction. For example, where member 151 may be a hinged door which can rotate out of the drawing, toward the viewer, while member 152 may be either a stationary door jamb or a second hinged door. In either case, it is possible for posts 162 to withdraw from slots 163 as member 151 rotates out of the plane of member 152.

Figure 19:
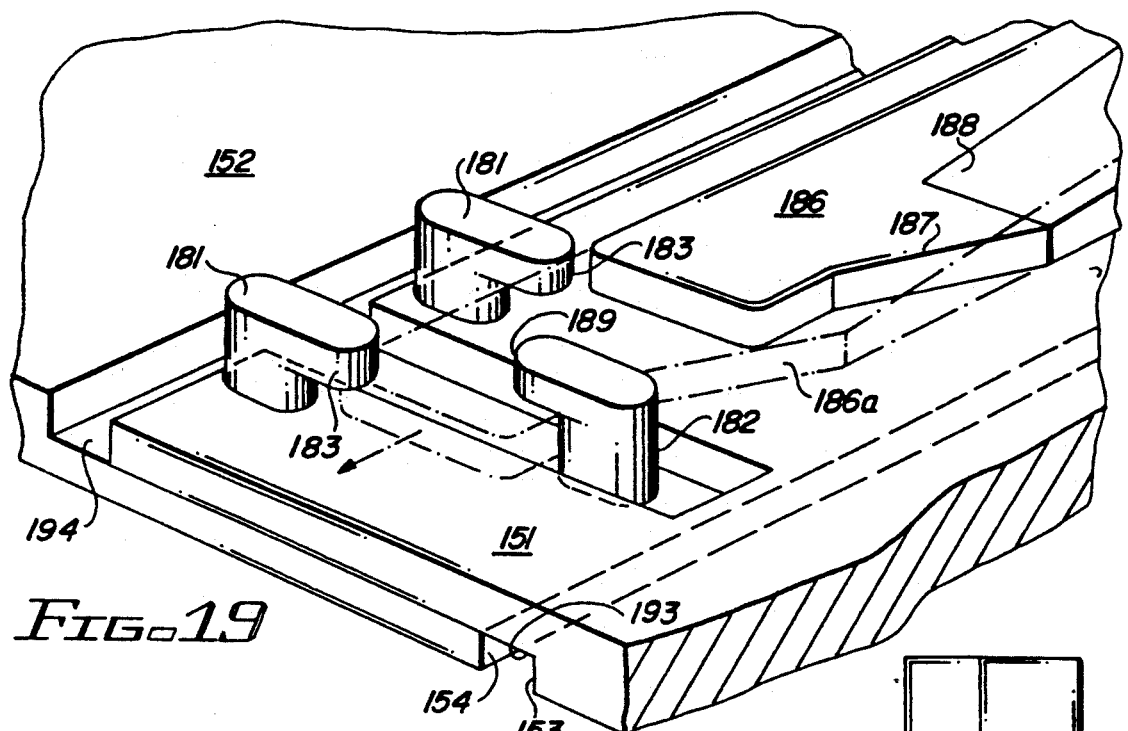
FIG. 19 illustrates a modified detail view of the FIG. 18 embodiment incorporating a compound wedge and undercut force transfer means to provide bidirectional closure.

FIG. 19 illustrates two modifications to the embodiment of FIG. 18 in a detail thereof. Members 151 and 152 are as before. However, transfer means 181 and 182 comprise posts having facing projections 183 and 184, respectively. These projections extend over wedge 186 when wedge 186 is advanced between transfer means 181, 182 as indicated in 186a. With the wedge in this position 186a, members 151 and 152 can no longer be displaced along the axial direction of pins 181, 182.

Figures 21, 22:
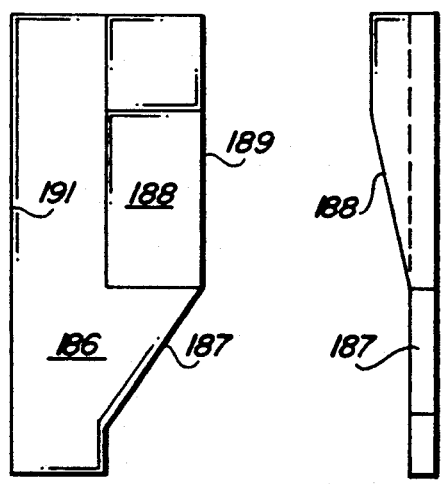
FIG. 21 is a top view of the wedge shown in FIG. 20.
FIG. 22 is a side view of the wedge shown in FIG. 20.
Figure 20:
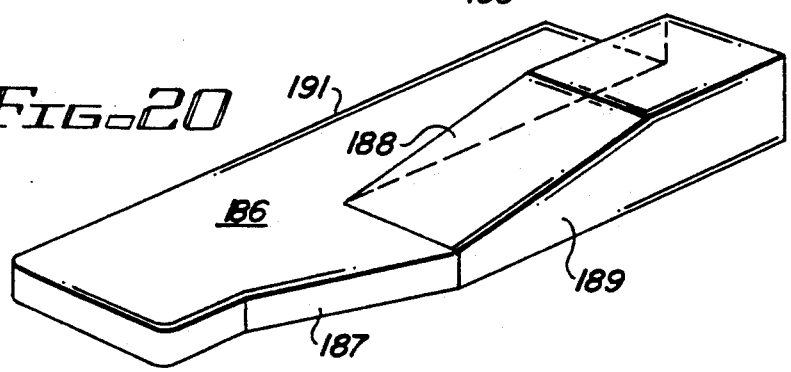
FIG. 20 is a perspective view of the wedge partially illustrated in FIG. 19.

FIGS. 20-22 more fully illustrates the dual taper wedge 186 shown in FIG. 19. Wedge 186 increases in width along tapered portion 187, which engages transfer means 181 and 182 (FIG. 19) to force them apart while drawing corresponding edges 153 and 154 together. Wedge 186 also increases in thickness along the second taper 188 which engages projection 184 on post 182 to draw members 151 and 152 into firm contact at corresponding edges 193, 194. As illustrated in FIGS. 19-22, wedge 186 first changes in width and further on changes in thickness. This enables one to join edges 153 and 154 with relatively little force. When taper 188 engages extension 184, the large area of contact between wedge 186 and the upper surface of member 151 will increase the frictional force which must be overcome to further move wedge 186. This not only secures the wedge in place but also draws surfaces 193 and 194 together to further seal and secure member 151 to member 152.

Figure 24:
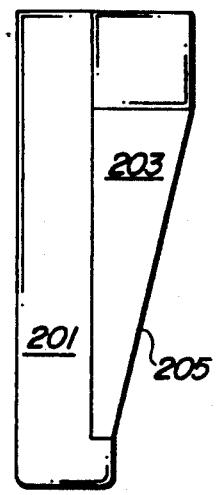
FIG. 24 is a top view of the wedge shown in FIG. 23.
Figure 23:
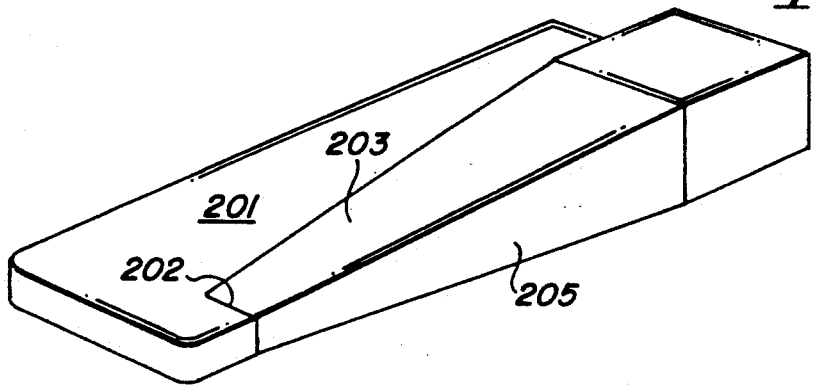
FIG. 23 illustrates an alternative form of compound wedge suitable for use in the detail of FIG. 19.
Figure 25:
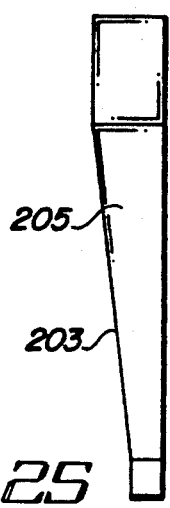
FIG. 25 is a side view of the wedge shown in FIG. 23.
Figure 26:
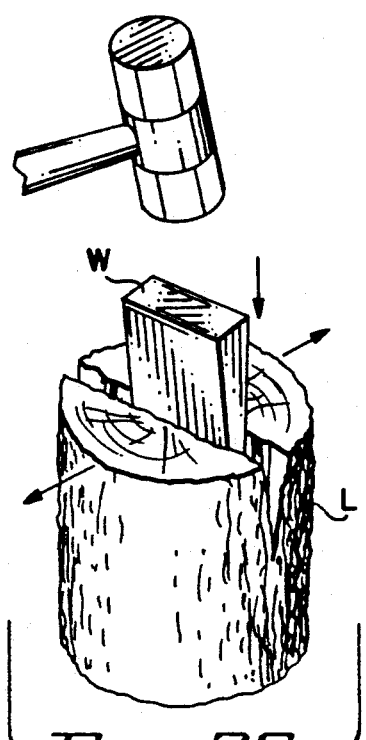
Figure 27:
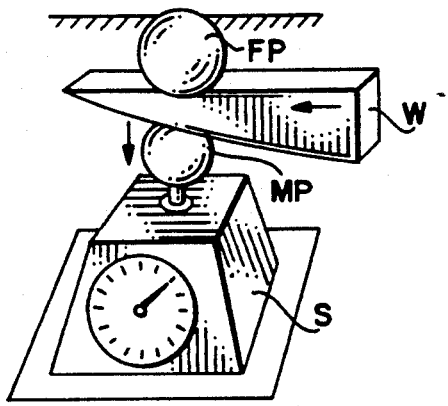
Figure 33:
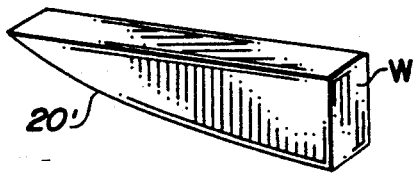
Figure 31:
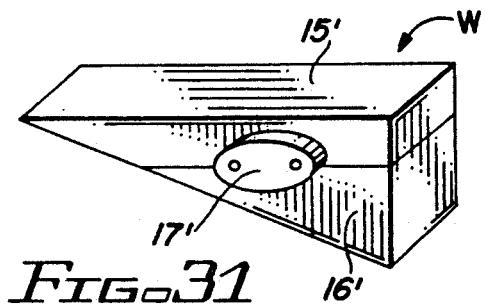
Figure 32:
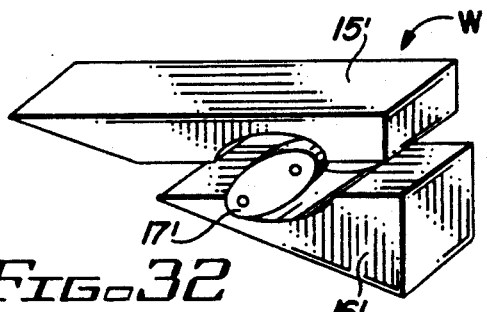
Figure 30:
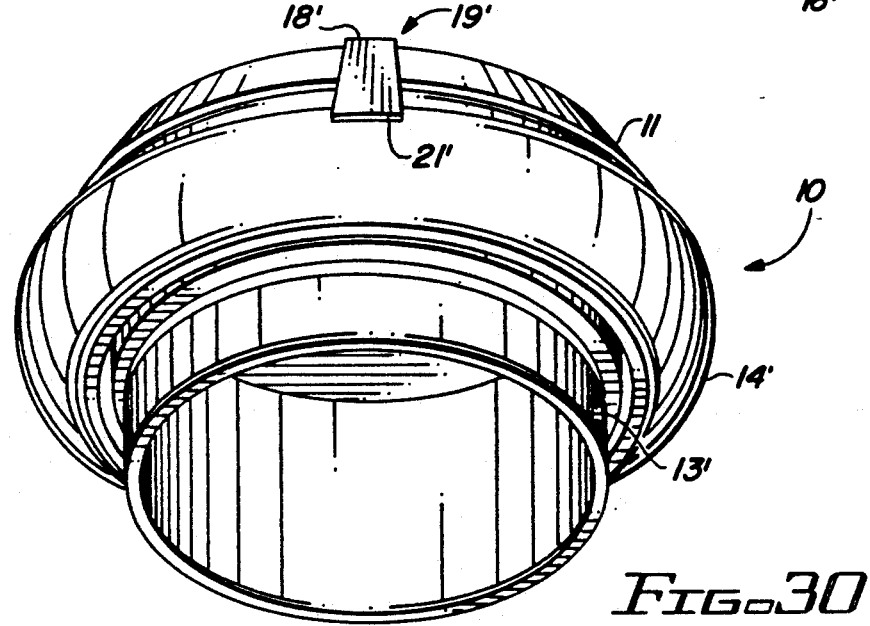
Figure 29:
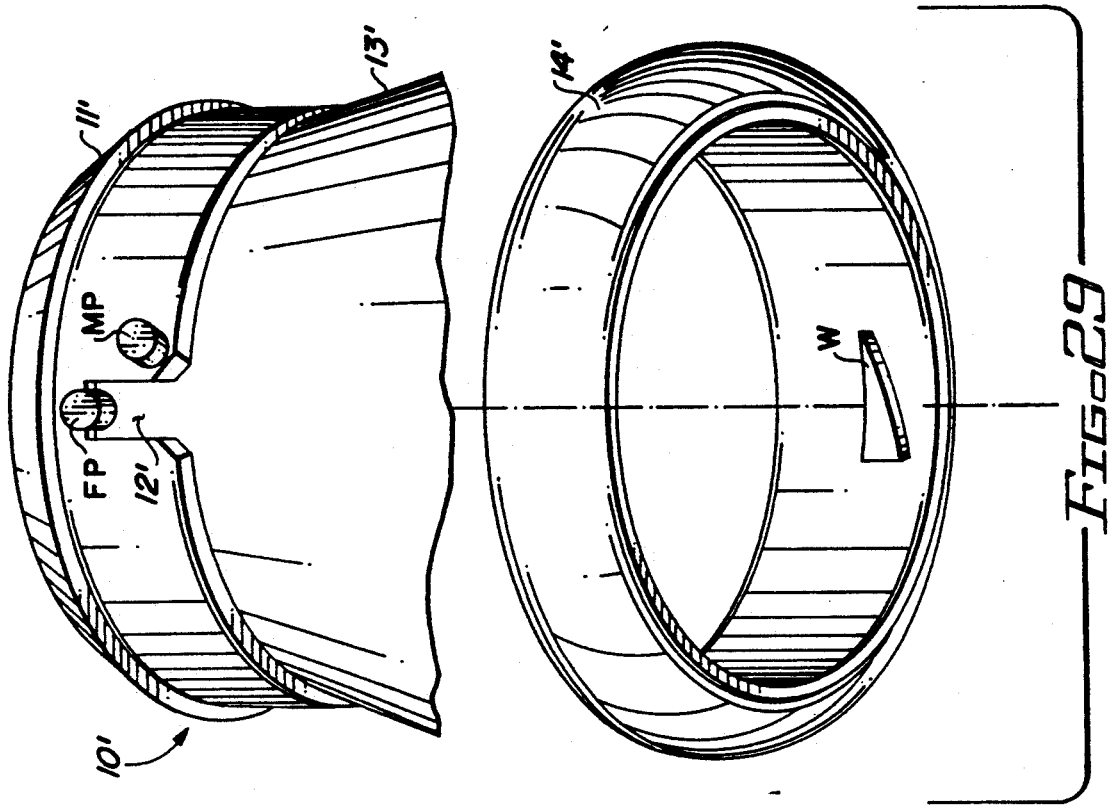
Figure 28:
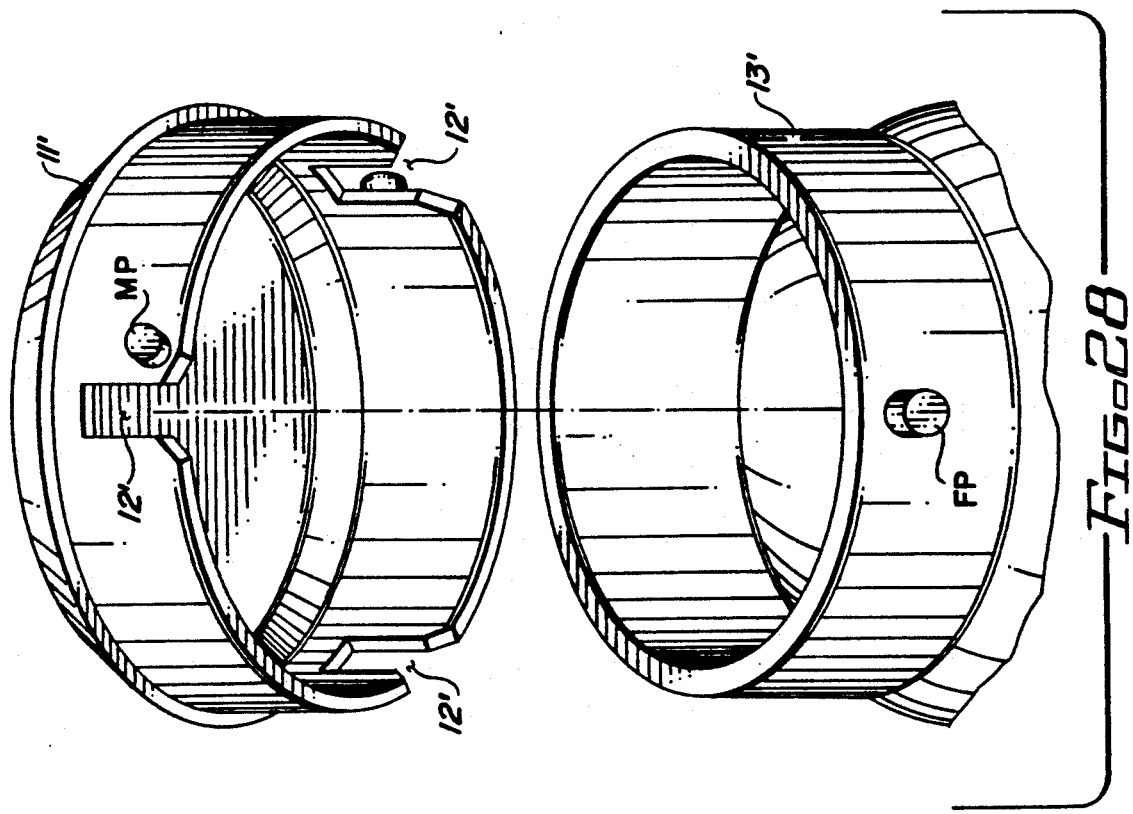

FIGS. 23-25 illustrate an alternative embodiment of a wedge in which the width and thickness change at the same time, although not necessarily with the same pitch. Wedge 201 has apex end 202 from which it increases in both thickness and width, producing tapers 203 and 205. As illustrated in FIGS. 19-25, the thickness of tapers 188 and 203 need not occupy the entire surface of the wedge, but only enough to engage projection 184 on post 182.

There is thus provided by the present invention a means for detachably joining two members without requiring that the members slide along or rotate with respect to one another. The resulting joint can transmit torque or shear between the members, securely fasten the members and allow for sealing of the joint between the two members, yet it is readily disconnected through the exertion of relatively little force. The closure forces exerted at the joint can be defined in terms of the shape of the wedge. The resulting joint is inherently safe for pressurized containers because the cap can be retained in place by the partially withdrawn wedge means while pressure is safely released through the partially opened joint. Where the invention is used in conjunction with medicine bottles, the cap can be rendered childproof.

Having thus described the invention, it is apparent to those of skill in the art that many variations can be made within the scope of the claimed invention. While one might imply a certain scale from the illustrations, it is understood that, for example, the principles illustrated in FIG. 5, apply equally to a perfume bottle, a well head, a refuse container or the end closure on a railroad tank car. Similarly, the particular type of the seal can have any configuration or be of any material. The corresponding edges where the two members are joined can form a line, area, circle or annulus of contact. The friction associated with use of the claimed apparatus can be varied by changing the design of the wedge means and its relationship with the first and second transfer means.

What is claimed is:

1. A method for detachably joining a first member having a first edge to a second member having a second edge at a plurality of locations along their corresponding first and second edges, the method comprising the steps of:
(a) movably aligning the corresponding edges in predetermined juxtaposition;
(b) moving a plurality of wedges between pairs of first force receiving points coupled to one member and second force receiving points coupled to the other member;
(c) advancing the plurality of wedges in a first direction to separate the first force receiving points from the second force receiving points to draw the corresponding edges toward each other;
(d) substantially limiting displacement between the corresponding edges, as the corresponding edges are drawn into and remain in their joined position.

2. The method of claim 1 including the further steps of
withdrawing the wedges from between the force receiving points and detaching the corresponding edges.

3. The method of claim 1 wherein steps (a) and (b) are performed concurrently.

4. The method of claim 3 wherein the steps are repeated.

5. The method of claim 1 wherein steps (b), (c) and (d) are sequentially carried out at the plurality of locations along the corresponding edges being joined.

6. The method of claim 1 wherein steps (b) and (c) are carried out sequentially and concurrently at all locations along the corresponding edges being joined.

7. The method of claim 6 including the further steps of concurrently withdrawing all of the wedges from between the pairs of force receiving points, thereby detaching the corresponding edges.

8. The method of claim 6 including the step of placing gasket material between the corresponding edges before the wedges are advanced to draw the corresponding edges toward one another.

9. The method of claim 1 including the step of placing gasket material between the corresponding edges before the wedges are advanced to draw the corresponding edges toward one another.

10. The method of claim 9 including the step of retaining a third member between the corresponding edges as the wedges are advanced to draw the corresponding edges toward one another.

11. The method of claim 1 including the step of retaining a third member between the corresponding edges as the wedges are advanced to draw the corresponding edges toward one another.

12. The method of claim 9 including the further steps of withdrawing the wedges from between the force receiving points; and, detaching the corresponding edges.

13. The method of claim 12 wherein the steps are repeated.

14. The method of claim 1 wherein the plurality of wedges are concurrently moved and advanced between first force receiving points which are coupled to one member and second and third force receiving points which are coupled to the second member.

15. The method of claim 1 wherein the wedges are advanced along a linear path.

16. The method of claim 1 wherein the wedges are advanced along a circular path.

17. Apparatus for detachably joining a first member having a first edge and second member having a second edge along their corresponding first and second edges, comprising in combination:
(a) registration means for movably aligning the corresponding edges in predetermined juxtaposition;
(b) a plurality of pairs of transfer means spaced along the corresponding edges of the first and second members, each of said pairs including
  (i) first transfer means for transferring forces to the first edge in a direction toward the second edge;
  (ii) second transfer means for transferring forces to the second edge in a direction toward the first edge;
(c) wedge means having opposite surfaces which converge in a first direction, said wedge means being movably disposed between respective pairs of first and second transfer means for forcing said pairs of transfer means apart when the wedge means is advanced in said first direction;
(d) means for substantially limiting displacement between the first and second edges, as said edges are drawn into and remain in their joined position,
whereby the corresponding edges of the first and second members are drawn together by forces created as the wedge means advances to separate the pairs of transfer elements and the corresponding edges are detachably joined with limited relative displacement in a predetermined juxtaposition.

18. The apparatus of claim 17 wherein the movement of said wedge means is linear and the corresponding edges of the first and second members define a common area of contact when joined.

19. The apparatus of claim 17 wherein the movement of said wedge means is circular and the corresponding edges of the first and second members define a common area of circular contact when joined.

20. The apparatus of claim 17 further including:
gasket means disposed between the corresponding edges for providing a deformable volume of material to compensate for irregularities in the shape or alignment of the corresponding edges when they are joined.

21. The apparatus of claim 20 wherein the gasket means substantially seals the corresponding edges against the passage of fluid under a predetermined pressure.

22. The apparatus of claim 17 wherein the registration means aligns the corresponding edges for movement toward and away from each other through substantially parallel planes.

23. The apparatus of claim 17 wherein said registration means pivotally aligns the corresponding edges of the first and second members.

24. The apparatus of claim 17 wherein said registration means and said means for substantially limiting displacement of the corresponding edges perform their respective functions through use of shared structural elements.

25. The apparatus of claim 1 wherein the plural pairs of transfer means are regularly spaced along the length of the corresponding edges, thereby uniformly distributing the forces produced as the wedge means advances in said first direction.

26. The apparatus of claim 25 wherein the pairs of first and second transfer means are of substantially identical structure.

27. The apparatus of claim 17 wherein movement of the wedge means provides substantially uniform forces for concurrently forcing said pairs of transfer means apart as the wedge means advances in said first direction.

28. The apparatus of claim 27 wherein the pairs of first and second transfer means are of substantially identical structure.

29. The apparatus of claim 28 wherein the plural pairs of transfer means are regularly spaced along the length of the corresponding edges, thereby uniformly distributing the forces produced as the wedge means advances in said first direction.

30. The apparatus of claim 17 wherein said first and second members are axially aligned circular tubes.

31. The apparatus of claim 30 further including a gasket material between the corresponding edges.

32. The apparatus of claim 17 wherein said first and second members are axially aligned circular rods.

33. The apparatus of claim 17 wherein said first and second members are substantially coplanar panels having geometrically mated corresponding edges.

34. The apparatus of claim 33 further including a gasket material between the corresponding edges.

35. The apparatus of claim 17 wherein said first member is a cylindrical tube and said second member is a cap for detachably enclosing the end of said tube.

36. The apparatus of claim 17 wherein said first member is a container with an open cylindrical end and said second member is a cap for detachably enclosing said end.

37. The apparatus of claim 36 further including a gasket material between the corresponding edges.

38. The apparatus of claim 17 wherein said first member is an enclosure having a defined opening and said second member is a closure for said opening.

39. The apparatus of claim 38 wherein the first member is a radiator filler opening and the second member is a radiator cap.

40. The apparatus of claim 39 further including a gasket material between the corresponding edges.

41. The apparatus of claim 17 further including: a third member which is retained between the corresponding edges of the first and second members as the wedge means advances and the corresponding edges are joined on opposing sides of the third member.

42. The apparatus of claim 41 further including a gasket material between at least one of the corresponding edges and said third member.

43. The apparatus of claim 41 wherein said first member is a rigid structure having a defined opening; said second member is a retention strip which conforms to at least one side of said opening; and, said third member is a cover for said opening which is retained between the corresponding edges of the first and second members as the wedge means is advanced.

44. The apparatus of claim 41 wherein said third member is transparent.

45. The apparatus of claim 41 wherein the forces created by advancement of said wedge means draw the first and second members together in a first direction and in a second direction orthogonal to said first direction.

46. A kit for use in detachably joining a first member to a second member, comprising the combination of:
a. a first intermediate structure for connection to said first member, including
  (i) a first registration means,
  (ii) a first plurality of transfer means adapted to transfer forces to the first member in the direction of the second member as the two members are joined,
  (iii) a first limit means;
b. a second intermediate structure for connection to said second member, including
  (i) a second registration means adapted to cooperate with said first registration means to movably align the first and second members in predetermined juxtaposition,
  (ii) a second plurality of transfer means paired with said first plurality of transfer means and adapted to transfer forces to the second member in the direction of the first member,
  (iii) a second limit means adapted to cooperate with said first limit means to substantially limit selected displacement between the first and second members when the two members are drawn into and remain in their joined position; and,
c. wedge means for movable disposition between the plurality of pairs of first and second transfer means and adapted to force said pairs apart when the wedge means is moved in a first direction, thereby drawing the two members together to their joined position.

47. The kit of claim 46 further including a gasket material for placement between the first and second members.

48. The kit of claim 46 further including a gasket material for placement between the first and second intermediate structures.

49. The kit of claim 46 wherein said registration means and said limit means include shared structural elements.

50. The kit of claim 46 wherein said registration means and said limit means include the same structural elements.

51. The kit of claim 46 wherein said wedge means is adapted for forward and reverse linear movement in a particular direction and wherein relative displacement between the two members is substantially limited in that particular direction.

52. The kit of claim 46 wherein the wedge means is adapted for rotational movement and wherein rotational displacement between the two members is substantially limited.

53. The kit of claim 46 further including a third member to be retained between the first and second intermediate structures.

* * * * *